No. 726,641. PATENTED APR. 28, 1903.
G. CHURCH.
FOLDING CLOTHES DRIER.
APPLICATION FILED JUNE 24, 1902.
NO MODEL. 2 SHEETS—SHEET 1.
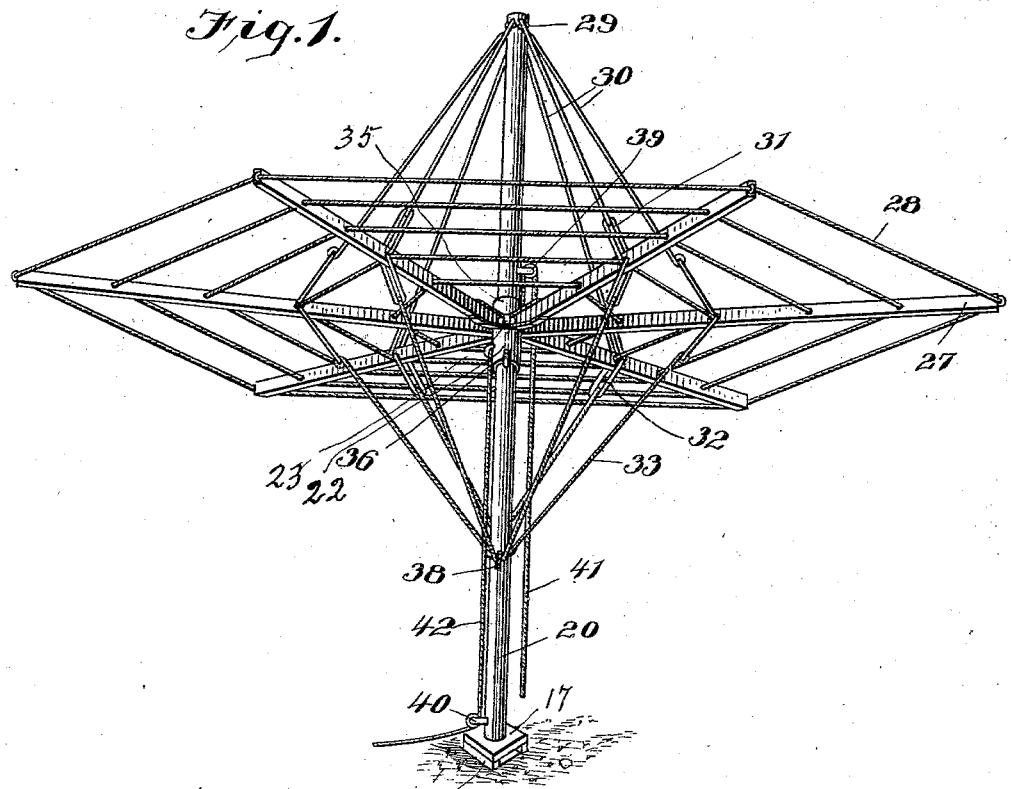
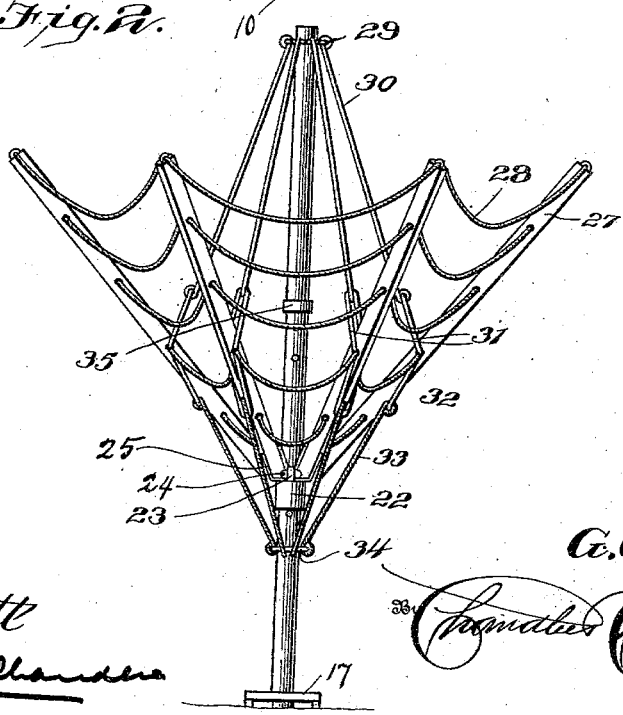
Witnesses
Inventor
G. Church,
Attorneys

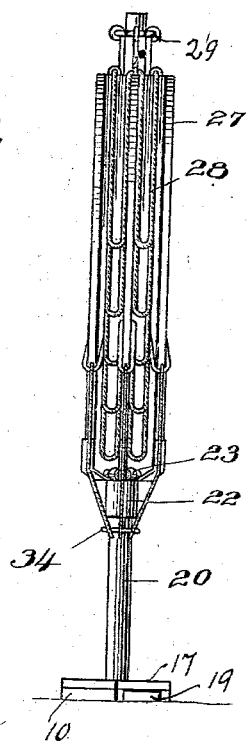
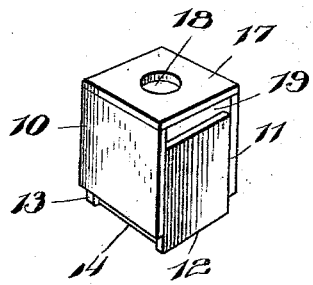
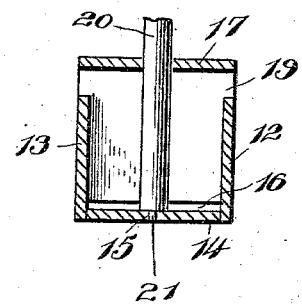
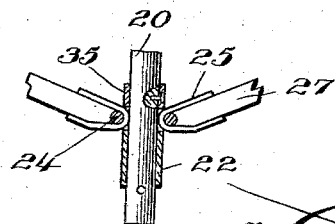

UNITED STATES PATENT OFFICE.

GEORGE CHURCH, OF MILTON, OREGON.

FOLDING CLOTHES-DRIER.

SPECIFICATION forming part of Letters Patent No. 726,641, dated April 28, 1903.

Application filed June 24, 1902. Serial No. 112,952. (No model.)

*To all whom it may concern:*

Be it known that I, GEORGE CHURCH, a citizen of the United States, residing at Milton, in the county of Umatilla, State of Oregon, have invented certain new and useful Improvements in Folding Clothes-Driers; and I do hereby declare the following to be a full, clear, and exact description of the invention, such as will enable others skilled in the art to which it appertains to make and use the same.

This invention relates to clothes-driers; and it has for its object to provide an improved structure in which the supporting-arms may be easily manipulated to move them to operative positions or to fold them against the mast.

In the drawings forming a portion of this specification, and in which like numerals of reference indicate similar parts in the several views, Figure 1 is a perspective view showing the device opened to its fullest extent. Fig. 2 is an elevation with the arms partly folded. Fig. 3 is an elevation showing the device completely folded. Fig. 4 is a perspective view of the base. Fig. 5 is a vertical section through the base and including the lower portion of the mast. Fig. 6 is a vertical section through a part of the mast and including the sliding sleeve and the inner end portions of two arms.

Referring now to the drawings, the present clothes-drier comprises a base of box shape, which includes the sides 10 and 11, between which are secured the sides 12 and 13, which latter terminate short of the upper ends of the sides 10 and 11 and project below their lower ends, the lower ends of the sides 12 and 13 being connected by the cross-piece 14, in which is the bearing-opening 15, there being interspaces 16 between the sides 10 and 11 and the cross-piece. Upon the upper ends of the sides 10 and 11 is mounted the top 17, having the central opening 18 in axial alinement with the opening 15, there being interspaces 19 between the upper ends of the sides 12 and the top 17.

The base above described is buried in the ground, so that the upper ends of the sides 12 and 13 are flush with the surface of the ground or are slightly thereabove to permit of a free circulation of air through the base, any moisture that may enter the base being drained out through the interspaces 16.

In connection with the base is a cylindrical mast 20, which is fitted in the opening 18 and has a pin 21 at its lower end, which engages the bearing 15, the mast being thus held in a vertical position, while it may be readily rotated upon the cross-piece 14, on which the lower end rests.

Upon the mast 20 is the sliding sleeve 22, having ears 23 at its upper end, which are bent outwardly into tubular form to encircle the ring 24, that is disposed over the sleeve, the ring forming the pintle of a hinge, which includes the ears and the straps 25, that are passed around the ring between the ears, and between which straps are fastened the inner ends of the arms 27. The inner extremities of the arms are in direct contact with the ring, said arms having transverse perforations therethrough, to which are laced the cords 28, on which the articles to be dried are hung, and these cords are of such lengths that when the arms are all in the same horizontal plane the cords are tense.

At the upper end of the mast are the eyes 29, with which are pivotally engaged the upper ends of stay-rods 30, having their lower ends pivotally connected to stirrups 31, engaged in certain of the perforations in the arms through which cords are threaded, these stays acting to hold the outer ends of the arms from dropping too low when the inner ends are raised by sliding the sleeve. To prevent the outer ends of the arms from rising, other stirrups 32 are engaged through the same perforations as the first-named stirrups, and connected to the stirrups 32 are stays 33 in the form of cords, which are attached at their lower ends to a ring 34, slidably mounted upon the mast below the sleeve.

Upon the mast above the sleeve is the fixed collar 35, so positioned that when the sleeve is raised in contact with the collar the upper stays will prevent downward movement of the outer ends of the arms from a horizontal plane, a pin 36 being engaged through a perforation in the mast to hold the sleeve in its raised position, while a second pin 38 is engaged with the post above the ring to hold the latter against upward movement.

When the clothes are to be attached to or detached from the drier, the upper pin is removed to permit the sleeve to slide downwardly and is then engaged in the lower hole, the lower pin having been first removed to permit the ring to slide or be drawn downwardly to move the arms in a corresponding direction at their inner ends. When the drier is to be folded, both pins are removed and the arms are moved inwardly against the mast, in which positions they may be tied. The mast may be then raised from the base and the drier may be laid away until it is to be again used.

To facilitate folding and unfolding of the arms, pulleys 39 and 40 are secured to the mast 20, one above the collar 35 and the other below the lower limit of movement of the sleeve 22. Cords 41 and 42 are attached to the sleeve and are passed through these pulleys, respectively, so that when the cord 41 is drawn the sleeve will be raised and when the cord 42 is drawn the sleeve will be lowered, thus effecting an unfolding and a folding of the device.

It will be understood that in practice modifications of the specific construction shown may be made and that any suitable materials and proportions may be used for the various parts without departing from the spirit of the invention.

What is claimed is—

A device of the class described comprising a mast, a sleeve slidably mounted upon the mast, a stop at the upper limit of movement of the sleeve, arms pivoted to the sleeve and radiating therefrom, supporting devices attached to the arms, stays pivoted to the arms and to the mast above the sleeve, a slide upon the mast below the sleeve, stays connected to the arms and to the slide, and means for holding the sleeve and slide against slidable movement.

In testimony whereof I affix my signature in presence of witnesses.

GEORGE CHURCH.

Witnesses:
  N. A. DAVIS,
  T. C. FRAZIER,
  G. A. COWL.